(12) United States Patent
Park (10) Patent No.: US 6,874,893 B2
(45) Date of Patent: Apr. 5, 2005

(54) LASER DISPLAY SYSTEM (75) Inventor: Chan Young Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/766,627

(22) Filed: Jan. 27, 2004

(65) Prior Publication Data
US 2004/0189955 A1 Sep. 30, 2004

(30) Foreign Application Priority Data
Jan. 27, 2003 (KR) ............................. 2003-5240

(51) Int. Cl.[7] .............. G03B 21/14; G02B 5/02; G02F 1/1335; F21V 5/00; H01S 3/00
(52) U.S. Cl. ................. 353/84; 353/31; 353/37; 353/99; 359/27; 359/599; 349/34; 349/106; 362/246; 362/355; 362/553; 362/558
(58) Field of Search ............... 353/84, 31, 30, 353/37, 98, 99; 349/22, 3, 61, 5, 104, 114, 15, 95, 839, 594, 64, 106, 112; 359/839, 594, 536, 27, 331, 28, 599, 707; 348/769, 67; 365/108; 362/259, 553, 558, 246, 355

(56) References Cited
U.S. PATENT DOCUMENTS 3,685,900 A * 8/1972 Kirby et al. ............... 355/32
3,914,721 A * 10/1975 Pollock ....................... 355/35
6,005,722 A * 12/1999 Butterworth et al. ........ 359/712
6,648,475 B1 * 11/2003 Roddy et al. ............... 353/31
2004/0076008 A1 * 4/2004 Ikeda ........................ 362/259

* cited by examiner

Primary Examiner—Judy Nguyen
Assistant Examiner—Rochelle Blackman
(74) Attorney, Agent, or Firm—Lee, Hong, Degerman, Kang & Schmadeka

(57) ABSTRACT

A laser display system is disclosed, to remove speckles displayed on a screen, which includes at least one laser as light source, at least one filter transmitting or reflecting a particular wavelength of red, green and blue light generated in the laser, and mixing the light red, green and blue light to one; a rotation color separator separating the mixed light into the red, green and blue light sequentially; a diffuser diffusing the separated light; an illuminating device irradiating with the light progressed from the diffuser; a display panel generating an image by modulating transmittance of the light from the illuminating device according to an electric signal of a video signal; and a controller receiving the video signal, and making correspondence of color areas from the rotation color separator and the display panel.

13 Claims, 6 Drawing Sheets

LASER DISPLAY SYSTEM

This application claims the benefit of the Korean Application No. P2003-5240, filed on Jan. 27, 2003, which is hereby incorporated by reference.

BACKGROUND OF THE INVENTION

1. Field of the Invention

The present invention relates to a display system, and more particularly, to a laser display system using a laser as a light source.

2. Discussion of the Related Art

In the past, a projection display system uses a lamp as a light source. However, a laser display system using a laser instead of the lamp has been developed recently. Hereinafter, the display system will be described with reference to the accompanying drawings.

Figure 1:
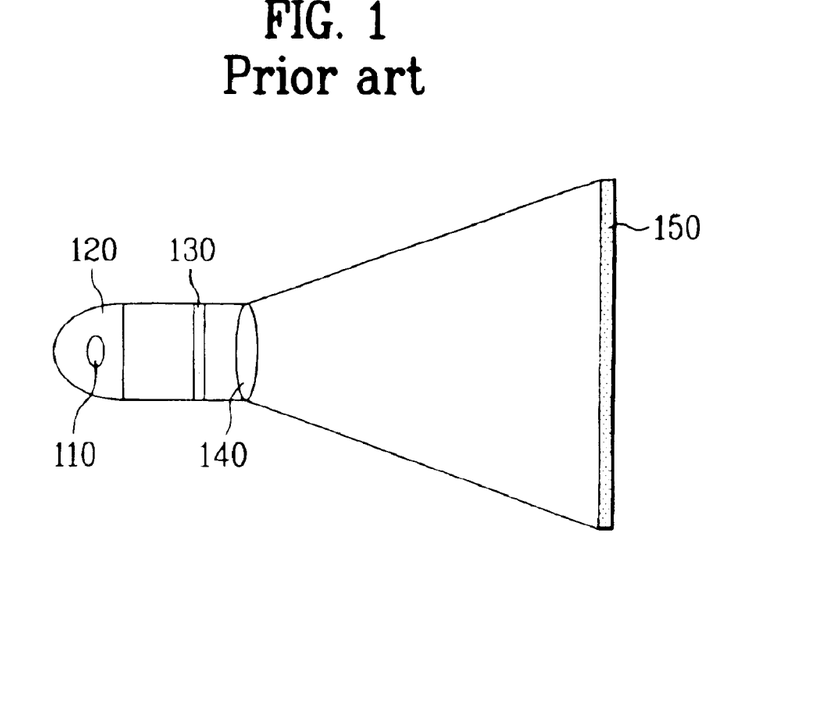
FIG. 1 is a structure view illustrating a projection display system according to the related art.

FIG. 1 is a detailed view illustrating a related art projection display system.

As shown in FIG. 1, the related art projection display system includes a lamp 110 generating light, a reflector 120 concentrating the light at one direction, a display panel 130 generating an image by modulating transmittance of light from the reflector according to a video signal, a projector 140 enlarging and projecting the image, and a screen 150 displaying the enlarged image.

The related art projection display system is operated as follows.

First, when the light is generated in the lamp 110, the light is concentrated at one direction in the reflector 120. In this state, the display panel 130 controls the amount of the light concentrated at one direction. At this time, the display panel 130 is usually formed of a liquid crystal display (LCD). After that, the image generated in the display panel 130 is enlarged in the projector 140, and the enlarged image is displayed on the screen 150.

Figure 2:
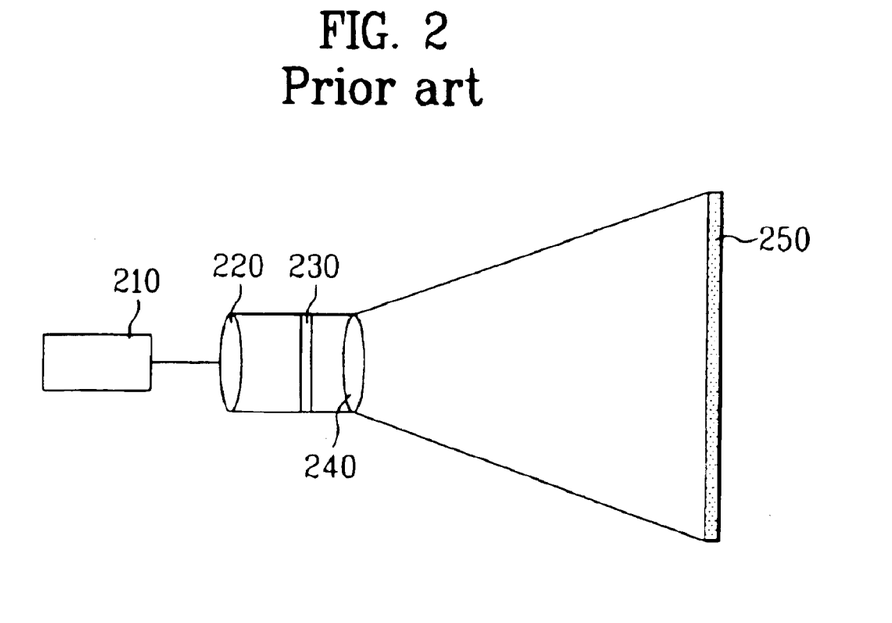
FIG. 2 is a structure view illustrating a laser display system according to the related art.

FIG. 2 is a structure view illustrating a related art laser display system.

As shown in FIG. 2, the projection display system includes a laser 210 generating light, a illuminating device 220 irradiating the light to a display panel, the display panel 230 generating an image by modulating transmittance of the light illuminated from the illuminating device 220 according to a video signal, a projector 240 enlarging and projecting the image, and a screen 250 displaying the enlarged image. The related art laser display system has no big difference from the projection display system. However, the related art laser display system uses the laser 210 as light source, whereby the image displayed on the screen 250 has high resolution and high contrast ratio.

Figure 3:
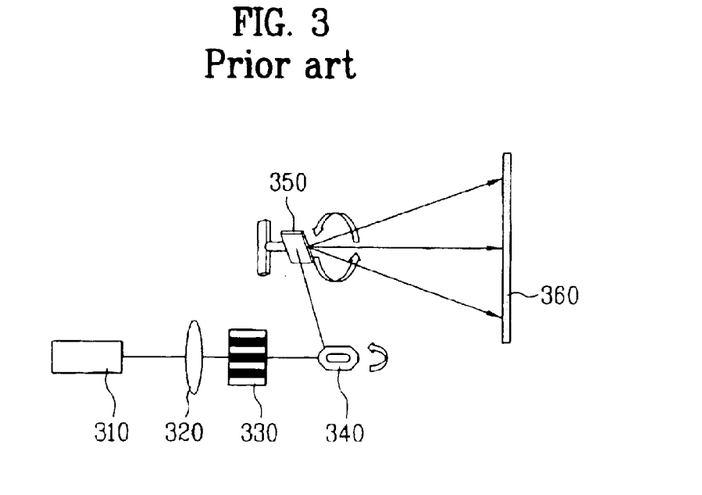
FIG. 3 is a structure view illustrating another laser display system according to the related art.

FIG. 3 is a structure view illustrating another laser display system according to the related art.

As shown in FIG. 3, the laser display system includes a laser 310 generating light, a concentrator 320 concentrating the light, an acousto-optic modulator AOM 330 modulating transmittance of the light from the concentrator 320 according to a video signal, a polygon mirror 340 obtaining a horizontal image of the video signal by rotating and reflecting the light transmitted from the AOM 330, a galvanometer 350 obtaining a vertical image of the video signal by repeating the light progressed from the polygon mirror 340 at a predetermined angle in up and down directions, and a screen 360 displaying the image obtained in the polygon mirror 340 and the galvanometer 350.

An operation of the laser display system according to the related art will be described as follows.

First, the laser 310 generates light, and the concentrator 320 concentrates the light at one direction. Then, the AOM 330 controls transmittance of the light concentrated according to an electric signal connected with the video signal.

After that, the polygon mirror 340 obtains the horizontal image of the video signal by rotating and repeating the light, and the galvanometer 350 obtains the vertical image of the video signal by repeating the light at the predetermined angle in up and down directions. Accordingly, the screen 360 displays the completed image:

The laser display system displays the image having high resolution, wide color resolution range and high contrast ratio.

However, the laser display system according to the related art has the following disadvantages.

In the laser display system according to the related art, speckles are generated on the screen due to an interference phenomenon of the laser according to coherence characteristics of the laser, thereby deteriorating picture quality by lowering contrast ratio and resolution.

SUMMARY OF THE INVENTION

Accordingly, the present invention is directed to a laser display system that substantially obviates one or more problems due to limitations and disadvantages of the related art.

An object of the present invention is to provide a laser display system removing speckles displayed on a screen by changing a phase of a laser light.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a laser display system having at least one laser as light source includes at least one filter transmitting or reflecting a particular wavelength of red, green and blue light generated in the laser, and mixing the light red, green and blue light to one; a rotation color separator separating the mixed light into the red, green and blue light sequentially; a diffuser diffusing the separated light; an illuminating device irradiating with the light progressed from the diffuser; a display panel generating an image by modulating transmittance of the light from the illuminating device according to an electric signal of a video signal; and a controller receiving the video signal, and making correspondence of color areas from the rotation color separator and the display panel.

At this time, the diffuser diffuses the red, green and blue light irregularly at different progressing angles.

Also, a color separation coating area is formed on the front of the rotation color separator, and a dispersing material coating area is formed on the rear thereof, and then the two area are rotated with a rotation axis, thereby integrating color separation and speckle prevention functions.

In another aspect, a laser display system having lasers generating red, green and blue light as light sources includes a diffuser diffusing the light generated in the lasers; an illuminating device irradiating with the diffused light; a display panel generating an image by modulating transmittance of the light from the illuminating device according to an electric signal of a video signal; and a controller sequentially turning on/off the lasers of the corresponding color after receiving the video signal and separating into red, green and blue signals.

At this time, the diffuser diffuses the red, green and blue light irregularly at different progressing angles.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Hereinafter, a laser display system according to the present invention will be described with reference to the accompanying drawings.

First Embodiment

Figure 4:
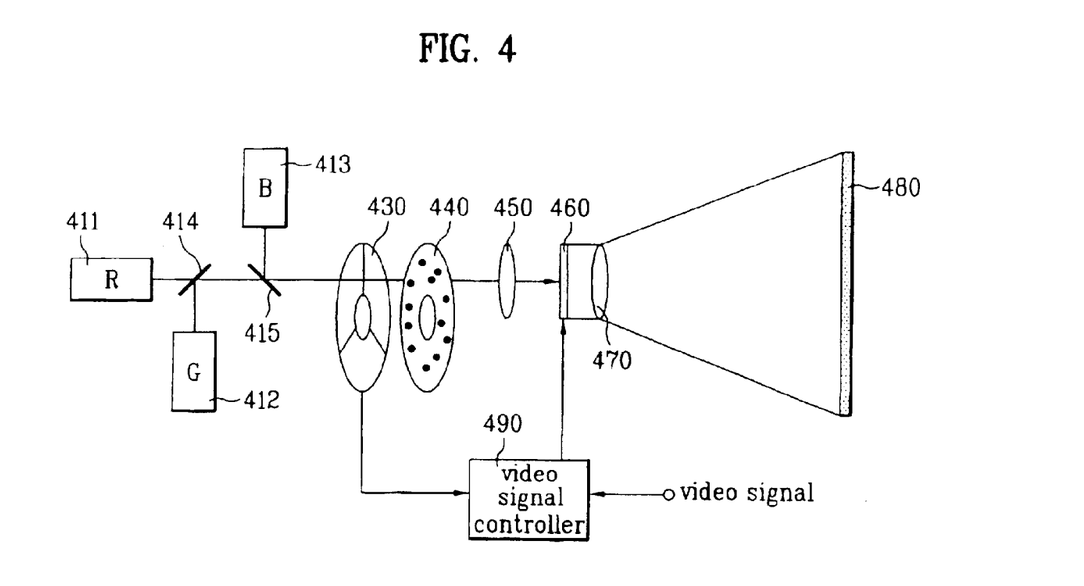
FIG. 4 is a structure view illustrating a laser display system according to the first embodiment of the present invention.

FIG. 4 is a structure view illustrating a laser display system according to the first embodiment of the present invention.

As shown in FIG. 4, the laser display system according to the first embodiment of the present invention includes a Red laser generating red light 411, a Green laser 412 generating green light, a Blue laser 413 generating blue light, first and second filters 414 and 415 mixing light by transmitting or reflecting a particular wavelength of red, green and blue light, a rotation color separator 430 separating the mixed light to red, green and blue light sequentially, a diffuser 440 diffusing the separated light, an illuminating device 450 irradiating a display panel 460 with the light from the diffuser 440, the display panel generating an image by modulating transmittance of the light from the illuminating device by receiving a video signal from a controller 490, a projector 470 enlarging and projecting the image, a screen 480 displaying the enlarged image, and the controller controlling a color area output from the rotation color separator and the display panel such that they correspond to the video signal.

An operation of the laser display system according to the present invention will be described with reference to the accompanying drawings.

First, the Red, Green and Blue lasers 411, 412 and 413 respectively generate the red, green and blue light. Then, the first and second filters 414 and 415 mix the red, green and blue light to generate white light. That is, the first filter 414 transmits the red light, and reflects the green light, thereby mixing yellow light. Also, the second filter 415 transmits the yellow light, and reflects the blue light, thereby mixing the white light.

However, the lasers 411, 412 and 413 may be positioned variously according to progressing directions of the light and transmittance components of the first and second filters 414 and 415. That is, the first filter 414 transmits the green light, and reflects the blue light, thereby mixing azure light. Also, the second filter 415 transmits the azure light, and reflects the red light, there mixing white light.

After that, the white light from the first and second filters 414 and 415 transmits through the rotation color separator 430. At this time, the rotation color separator 430 sequentially separates the incident light in order of red, green and blue light, and progresses the separated light to the display panel 460.

In more detail, the aforementioned process will be described with reference to FIG. 5, FIG. 6A, FIG. 6B, and FIG. 7A to FIG. 7D.

In order to obtain a color image with one display panel 460, it is required to divide one image to time periods of displaying the respective colors of red, green and blue. Then, the red, green and blue colors are sequentially obtained on one image. That is, one image displays the respective red, green and blue colors for ¹⁄₁₈₀ second at 60 Hz, thereby displaying the color image.

Figure 5:
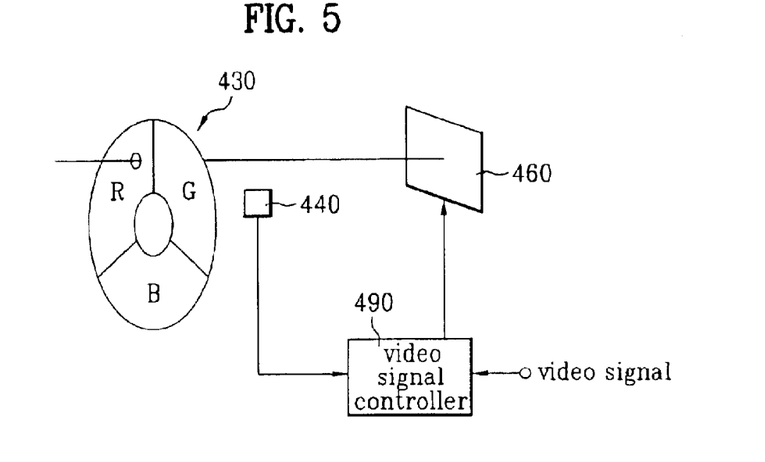
FIG. 5 is a structure view illustrating a rotation color separator according to the present invention.

As shown in FIG. 5, the rotation color separator 430 is divided into R, G and B areas for transmitting the red, green and blue colors. As the rotation color separator 430 is rotated, the respective areas of red, green and blue are sequentially irradiated with the white light, whereby only the light of the corresponding area is transmitted. That is, the red, green and blue colors are sequentially separated, and then progressed to the diffuser 440.

The diffuser 440 diffuses the red, green and blue light separated in the rotation color separator 430, whereby the respective color light is diffused irregularly at different progressing angles. In this case, as the diffuser 440 is rotated, the light is transmitted, whereby the diffusion intensity is irregular. Accordingly, the phase of the light is changed irregularly, thereby removing interference characteristics of light. That is, it is possible to prevent speckles, interference patterns, from generating on the screen.

Figure 7A:
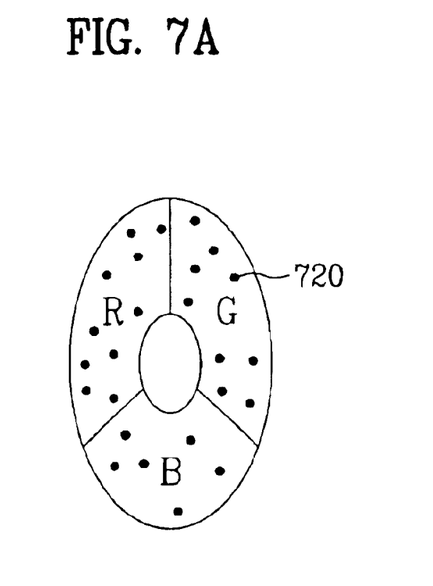
FIG. 7A and FIG. 7B are structure views illustrating a rotation color separator according to another embodiment of the present invention.

As shown in FIG. 7A, it is possible to integrate the diffuser 440 with the rotation color separator 430. That is, a light-dispersing material 720 is added to the rotation color separator 430, whereby it is possible to obtain color separation and speckle prevention functions simultaneously.

Figure 7B:
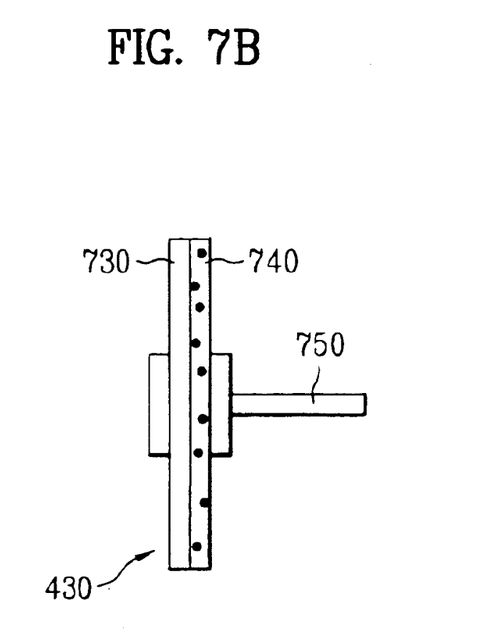

As shown in FIG. 7B, a color separation coating area 730 is formed on the front of the rotation color separator 430, and a dispersing material coating area 740 is formed on the rear thereof. Then, the two areas 730 and 740 are rotated with a rotation axis 750, thereby integrating color separation and speckle prevention functions.

Meanwhile, the display panel 460 receives the respective red, green and blue from which the speckle is removed, whereby the display panel 460 obtains one color image. That is, the controller 490 receives and separates the video signal into the red, green and blue color signals. After that, the controller 490 transmits the respective color signals to the display panel 460. Then, the display panel 460 displays the respective colors so as to obtain one color image. In order to make the light of the color separated in the rotation color separator 430 correspond to the light of the color displayed on the display panel 460, the rotation color separator 430 has a sensor for detecting the color of the light transmitted in the rotation color separator 430. Then, the controller 490 transmits the corresponding color signal to the display panel 460. The light of the color separated in the rotation color separator 430 is synchronized with the light of the color displayed on the display panel 460, whereby it is possible to obtain the correct color image with high resolution.

Figure 6A:
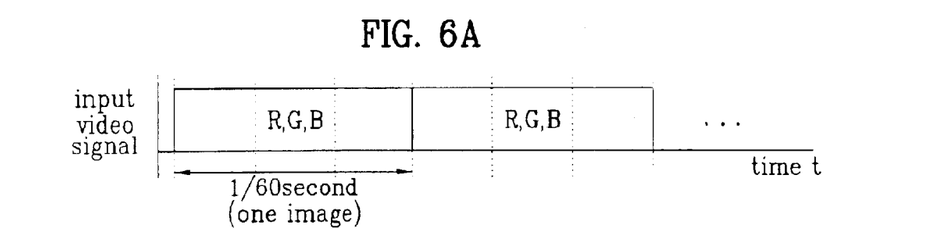
FIG. 6A to FIG. 6D are time charts illustrating a controller according to the first embodiment of the present invention.
Figure 6B:
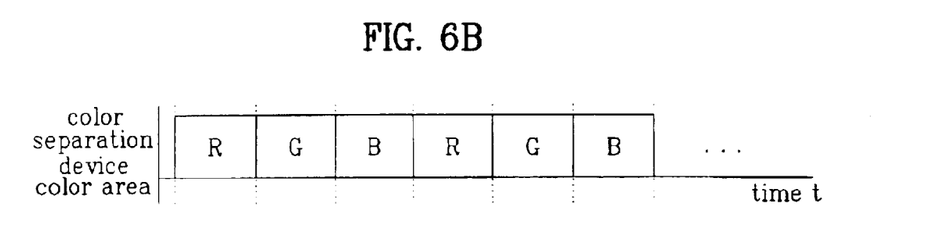
Figure 6C:
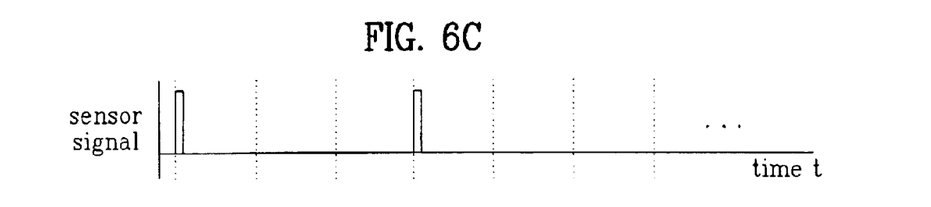
Figure 6D:
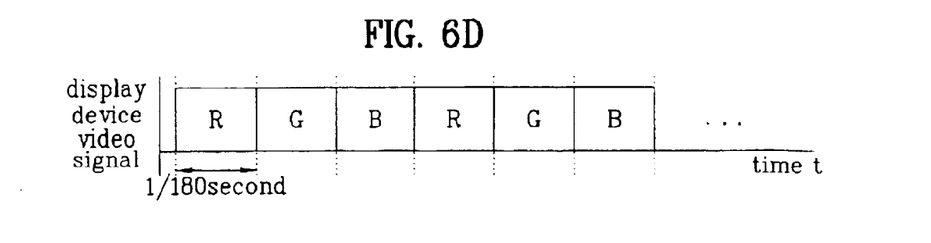

In more detail, as shown in FIG. 6B, the display panel 460 is irradiated with the light transmitting through the rotation color separator 430 by the illuminating device 450. At this time, the light is simply separated into the red, green and blue color areas. Then, as shown in FIG. 6A, the controller 490 receives the video signal (electric signal in which the red, green and blue color signals are mixed), and then the video signal is synchronized to a sensor signal as shown in FIG. 6C. Then, the video signal is transmitted to the display panel 460. Then, as shown in FIG. 6D, the color image is obtained on the display panel 460. That is, the light having the color identical to that of the rotation color separator 430 is displayed on the display panel 460. After that, the image displayed on the display panel 460 is enlarged/projected in the projector 470, and then is displayed on the screen 480.

Second Embodiment

Figure 8:
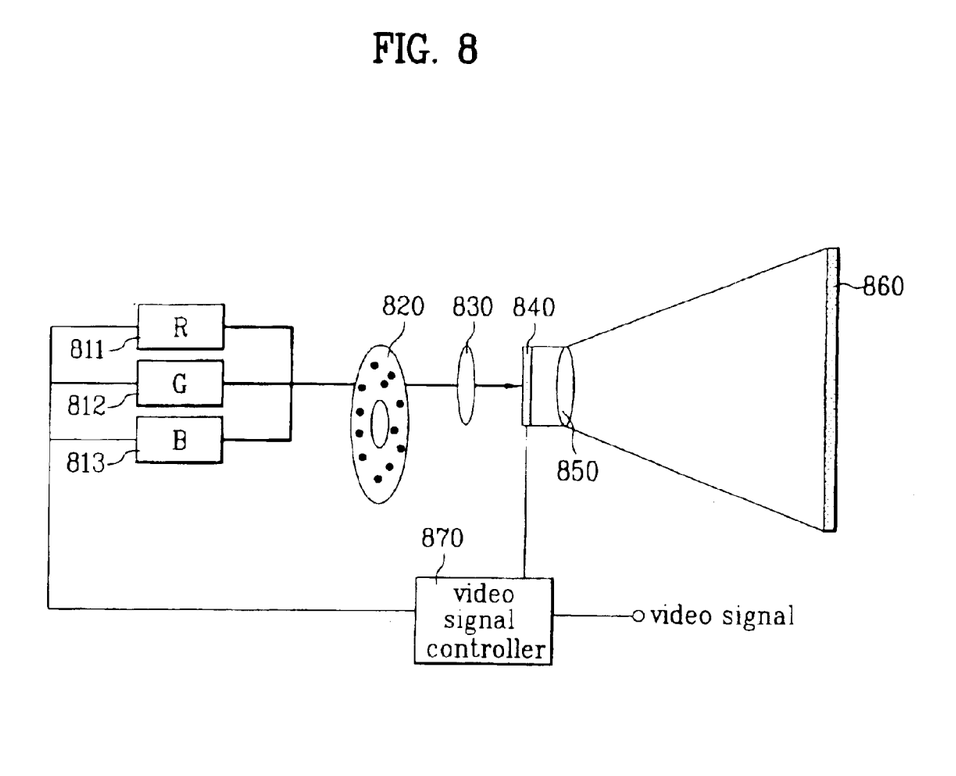
FIG. 8 is a structure view illustrating a laser display system according to the second embodiment of the present invention.

FIG. 8 is a structure view illustrating a laser display system according to the second embodiment of the present invention.

Referring to FIG. 8, the laser display system according to the second embodiment of the present invention includes a Red laser 811 generating red light, a Green laser 812 generating green light, a Blue laser 813 generating blue light, a diffuser 820 diffusing the red, green and blue light, an illuminating device 830 irradiating a display panel 840 with the diffused light, the display panel generating an image by modulating transmittance of the light from the illuminating device 830 by receiving a video signal from a controller 870, a projector 850 enlarging and projecting the image, a screen 860 displaying the enlarged image, and the controller sequentially turning on/off the lasers 811, 812 and 813 of the corresponding color after receiving and separating the video signal into the red, green and blue color signals.

An operation of the laser display system according to the present invention will be described with reference to the accompanying drawings.

First, the controller 870 turns on/off the Red, Green and Blue lasers 811, 812 and 813, whereby the red, green and blue light is sequentially generated. Then, the diffuser 820 diffuses the red, green and blue light, whereby the respective color light is diffused irregularly at different progressing angles. In this case, as the diffuser 820 is rotated, the light is transmitted, whereby the diffusion intensity is irregular. Accordingly, the phase of the light is changed irregularly, thereby removing interference characteristics of light. That is, it is possible to prevent speckles, interference patterns, from generating on the screen.

At this time, the display panel 840 is irradiated with the white light transmitting through the diffuser 820 by the illuminating device 830. Hereinafter, this process will be described with reference to FIG. 9A to FIG. 9E.

Figure 9A:
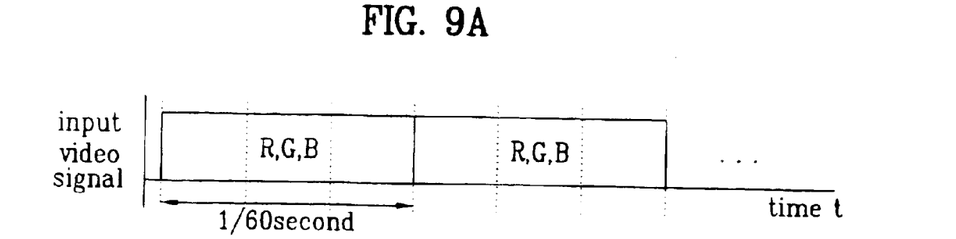
FIG. 9A to FIG. 9E are time charts illustrating a controller according to the second embodiment of the present invention.
Figure 9B:
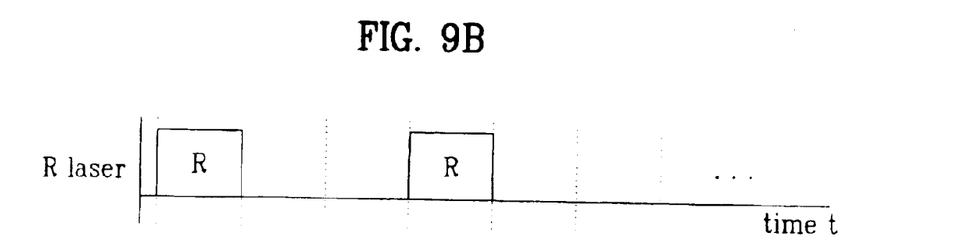
Figure 9C:
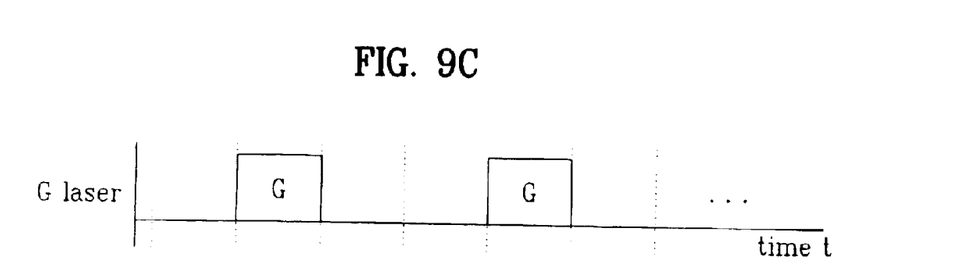
Figure 9D:
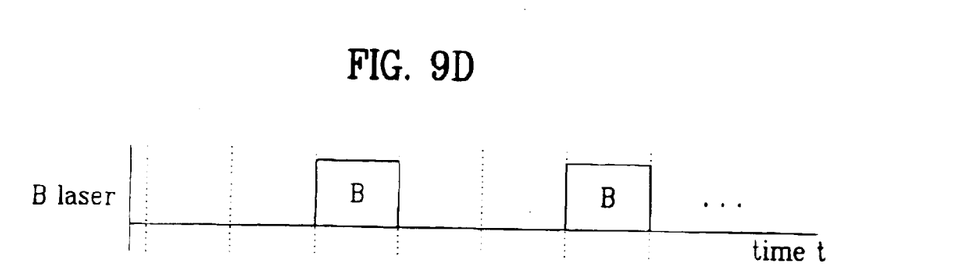
Figure 9E:
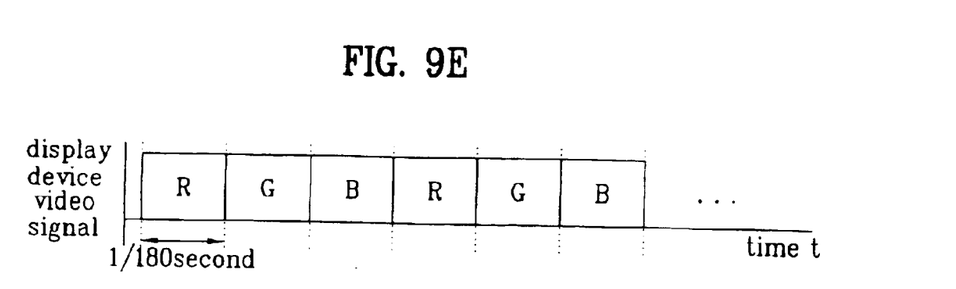

As shown in FIG. 9A, the controller 870 receives the video signal in which the red, green and blue color signals are mixed and separates the video signal into red, green and blue color signals. Then, the controller 870 sequentially turns on/off the Red, Green and Blue lasers 811, 812 and 813 according to the separated color signal, whereby the light for irradiating the display panel 840 is sequentially outputted as shown in FIG. 9B to FIG. 9D. Then, the color image is obtained on the display panel 840 as shown in FIG. 9D. That is, the image that is identical to the video signal inputted to the controller 870 is displayed on the display panel 840. After that, the image obtained on the display panel 840 is enlarged/projected in the projector 850, and then displayed on the screen 860.

As mentioned above, the laser display system according to the present invention has the following advantages.

In the laser display system according to the present invention, it is possible to remove the interference characteristics of the light from the light source, whereby speckles are removed on the image displayed on the screen, thereby improving picture quality by obtaining high resolution and clear image.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A laser display system having at least one laser as light source, the laser display system comprising:

at least one filter transmitting or reflecting a particular wavelength of red, green and blue light generated in the laser, and mixing the light red, green and blue light to one;

an integrated rotation color separator and diffuser adapted to sequentially separate the mixed light into the red, green and blue light and simultaneously diffuse the separated light, wherein a color separation coating area and a dispersing material coating area are formed on the rotation color separator such that color separation and speckle prevention functions are integrated;

an illuminating device irradiating with the light from the integrated rotation color separator and diffuser;

a display panel generating an image by modulating transmittance of the light from the illuminating device according to a video signal; and a controller receiving the video signal and adapted to make color areas from the integrated rotation color separator and diffuser and the display panel correspond.

2. The laser display system as claimed in claim 1, wherein at least one filter includes:

a first filter for mixing yellow light by transmitting the red light and reflecting the green light; and a second filter transmitting the yellow light and reflecting the blue light.

3. The laser display system as claimed in claim 1, wherein at least one filter includes:

a first filter for mixing azure light by transmitting the green light and reflecting the blue light; and a second filter transmitting the azure light and reflecting the red light.

4. The laser display system as claimed in claim 1, wherein the rotation color separator is divided into R, G and B areas for transmitting the red, green and blue colors and the respective areas of red, green and blue are sequentially irradiated with white light as the integrated rotation color separator and diffuser is rotated, whereby only the light of the corresponding area is transmitted.

5. The laser display system as claimed in claim 1, wherein the diffuser diffuses the red, green and blue light irregularly at different progressing angles.

6. The laser display system as claimed in claim 1, wherein the controller detects the color of the light transmitted in the rotation color separator, and transmits the signal of the corresponding color to the display panel by synchronizing with the detected color.

7. The laser display system as claimed in claim 1, wherein the color separation coating area and dispersing material coating area are rotated with a rotation axis.

8. A method of providing a laser display with at least one laser as a light source, the method comprising:

transmitting or reflecting a particular wavelength of red, green and blue light generated in the laser and mixing the light red, green and blue light to one;

sequentially separating the mixed light into the red, green and blue light and simultaneously diffusing the separated light, wherein color separation and sprinkle prevention functions are integrated by forming a color separation coating area and a dispersing material coating area on an integrated color separation and diffusing device;

irradiating with the diffused light;

generating a display image by modulating transmittance of the illuminated light according to a video signal; and controlling the correspondence between color areas of the separated red, green and blue light and the displayed image according to the video signal.

9. The method of claim 8, further comprising:

mixing yellow light by transmitting the red light and reflecting the green light; and transmitting the yellow light and reflecting the blue light.

10. The method of claim 8, further comprising:

mixing azure light by transmitting the green light and reflecting the blue light; and transmitting the azure light and reflecting the red light.

11. The method of claim 8, wherein the respective areas of red, green and blue are sequentially irradiated with white light, whereby only the light of the sequentially irradiated area is transmitted.

12. The method of claim 8, wherein the red, green and blue light is diffused irregularly at different progressing angles.

13. The method of claim 8, further comprising rotating the formed color separation coating area and dispersing material coating area with a rotation axis.

* * * * *